(12) United States Patent
Premec et al.

(10) Patent No.: US 8,275,987 B2
(45) Date of Patent: Sep. 25, 2012

(54) METHOD FOR TRANSMISSION OF DHCP MESSAGES

(75) Inventors: Domagoj Premec, Zagreb (DE); Maximilian Riegel, Numberg (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 450 days.

(21) Appl. No.: 12/311,860

(22) PCT Filed: Oct. 15, 2007

(86) PCT No.: PCT/EP2007/060977
§ 371 (c)(1),
(2), (4) Date: Apr. 16, 2009

(87) PCT Pub. No.: WO2008/046813
PCT Pub. Date: Apr. 24, 2008

(65) Prior Publication Data
US 2010/0191963 A1  Jul. 29, 2010

(30) Foreign Application Priority Data

Oct. 16, 2006 (EP) ..................................... 06021659
Apr. 11, 2007 (EP) ..................................... 07007443

(51) Int. Cl.
*H04L 29/06* (2006.01)
(52) U.S. Cl. ........ 713/168; 709/206; 713/151; 713/153; 713/155
(58) Field of Classification Search ................. 713/155, 713/168, 151, 153; 380/255, 247–250, 270, 380/44; 705/67; 709/225–226, 229, 206; 370/395.2
See application file for complete search history.

(56) References Cited

U.S. PATENT DOCUMENTS

| | | | |
|---|---|---|---|
| 2004/0054902 A1* | 3/2004 | Fujimoto et al. | 713/168 |
| 2006/0098614 A1* | 5/2006 | Moon et al. | 370/338 |
| 2007/0217427 A1* | 9/2007 | Chung | 370/395.2 |
| 2008/0270794 A1* | 10/2008 | Falk et al. | 713/168 |
| 2010/0017601 A1* | 1/2010 | Falk et al. | 713/168 |
| 2011/0010538 A1* | 1/2011 | Falk et al. | 713/155 |

FOREIGN PATENT DOCUMENTS

| | | | |
|---|---|---|---|
| EP | 1914960 A1 | * | 4/2008 |
| RU | 2273107 | | 3/2006 |
| WO | 2007051787 | | 10/2007 |

OTHER PUBLICATIONS

WiMAX, WiMAX End-to-End Network Systems Architecture, 2006 (Stage 3).*
C. Rigney, RFC 2865—Remote Authentication Dial in User Service, Jun. 2000.*
WiMAX, WiMAX End-to-End Network Systems Architecture, 2006 (Stage 2).*

(Continued)

*Primary Examiner* — Jung Kim
*Assistant Examiner* — Shan Elahi
(74) *Attorney, Agent, or Firm* — Squire Sanders (US) LLP

(57) ABSTRACT

The invention describes a method for transmission of a DHCP message between a telecommunication network, especially a telecommunication network according to the WiMAX-standard, and an Internet Protocol (IP) subscriber (SS/MS; MN) to the telecommunication network. Therein, an information secured with an encryption key is added to the DHCP message. The encryption key is derived from a basic key being provided by a network component of the telecommunication network.

18 Claims, 3 Drawing Sheets

OTHER PUBLICATIONS draft-yegin-eap-boot-rfc3118-02.txt, RFC 3118, Feb. 2006.*
RFC3118, Authentication for DHCP Message, Jun. 2001.*
RFC4030, The Authentication Suboption for the DHCP Relay Agent Option, Mar. 2005.*
RFC2868, RADIUS Attributes for Tunnel Protocol Support.*
IPRP Report, PCT IPRP Report, Nov. 2009.*
RFC 3118, "Bootstrapping RFC 3118 Delayed DHCP Authentication Using EAP-based Network Access Authentication: draft-yegin-eap-boot-rfc3118-02.txt", Aug. 2006.*
C. Rigney et al., "Remote Authentication Dial in User Service (RADIUS)", RFC2865, Standards Track http://rfc.net/rfc2865.html, Jun. 2000, pp. 1-77.
WiMAX NWG Stage 2, "WiMAX End-to-End Network Systems Architecture", Aug. 8, 2006, pp. 1-243.
WiMAX NWG Stage 3, "WiMAX End-to-End Network Systems Architecture", Aug. 8, 2006, pp. 1-335.
Tschofenig Siemens A Yegin Samsung D Forsbert Nokia H: "Bootstrapping RFC3118 Delayed DHCP Authentication Using EAP-based Network Access Authentication; draft-yegin-eap-boot-rfc3118-02.txt" IETF Standard-Working-Draft, Internet Engineering Task Force, IETF, CH, No. 2, Feb. 2006.
Stapp Cisco Systems M et al: "The authentication Suboption for the Dynamic Host Configuration Protocol (HCP) Relay Agent Option; rfc4030.txt", IETF Standard, Internet Engineering Task Force, IETF, Ch, Mar. 2005.
Droms R et al: "Authentication for DHCP Messages; rfc3118.txt", IETF Standard, Internet Engineering Task Force, IETF, CH, Jun. 2001.
Decision to Grant; dated Nov. 24, 2011, Issued on Corresponding Russian Application No. 2009118395.

* cited by examiner

METHOD FOR TRANSMISSION OF DHCP MESSAGES

The invention relates to a method for transmission of a DHCP message between a telecommunication network, especially a telecommunication network according to the WiMAX-standard, and an Internet Protocol (IP) subscriber to the telecommunication network.

In the following description it is made reference to a WiMAX telecommunication network to explain the problem underlying the present invention. This reference to a WiMAX telecommunication network is just an example. In fact, the invention relates to any kind of telecommunication network.

Figure 1:
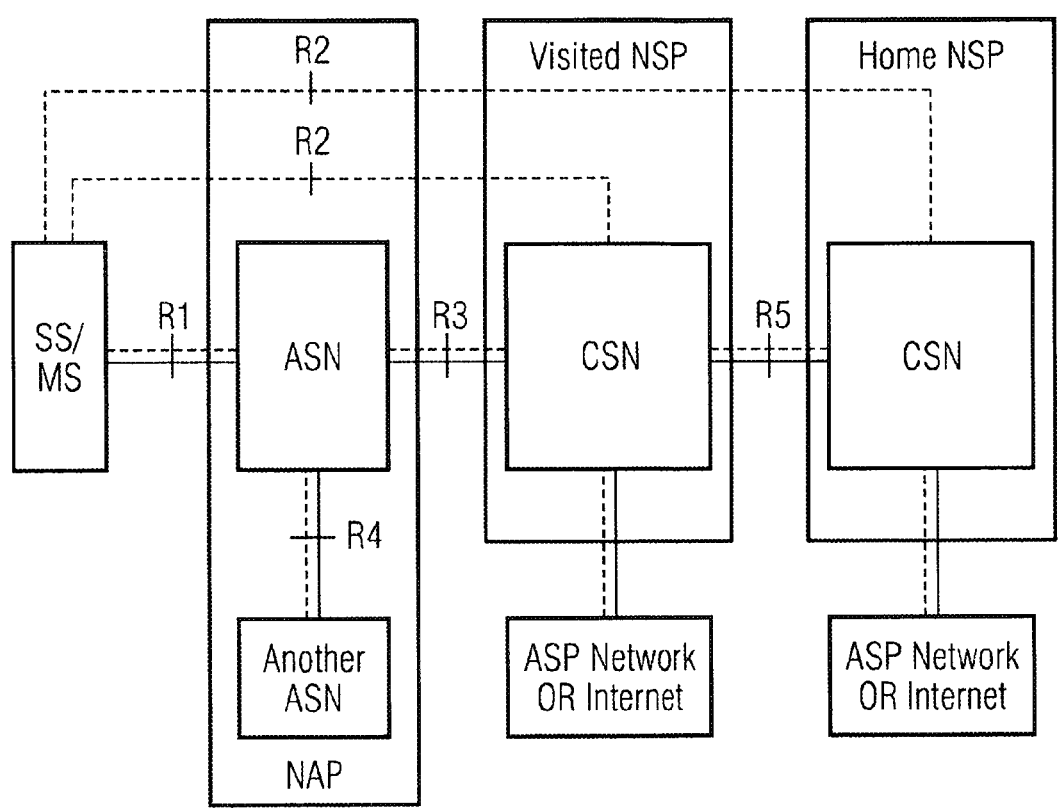

The WiMAX network consists of a WiMAX connectivity serving network (CSN) which is comparable to a core network and a WiMAX access serving network (ASN) which has the role of a wireless access network. The ASN and the CSN could be operated by different business entities or operators. The overall architecture of a WiMAX network is shown in FIG. 1 which depicts a reference model of the WiMAX network. A detailed description of the network reference model can be found under www.wimaxforum.org/technology/documents/in the specification "WiMAX end-to-end network systems architecture", Chapter 6, "Network Reference Model". The content of this draft specification is incorporated by reference in this specification.

The CSN always contains a home agent of a WiMAX subscriber. The home agent cannot be located in the ASN. The home agent has the task of defending the subscriber's home address on its home network (CSN) while the subscriber is away from home. This means that the home address of the subscriber is topologically correct in the subnet where the home agent is located, and as such the home address must be allocated by the CSN domain. The home network of the WiMAX subscriber may be dynamically assigned and it may be either in a Home-CSN (H-CSN) or a Visited-CSN (V-CSN) depending on a roaming agreement between the home and the visited WiMAX network service provider (NSP).

A feature of the WiMAX network architecture is the support for so-called "simple Internet Protocol (IP)" terminals as subscriber which do not contain an implementation of a mobile IP stack. The mobility at the network (IP) layer for these devices is managed by the ASN by means of a proxy mobile IP.

Simple IP terminals use DHCP to acquire an IP address and other IP configuration parameters. The IP address for the simple IP terminal is allocated by the CSN (either H-CSN or V-CSN) but the assignment of this address to the terminal is performed by the access network ASN. For the assignment of this address a DHCP relay has to be provided in the ASN. In contrast thereto, a DHCP server is located in the CSN, and the DHCP relay in the ASN relays DHCP messages from the simple IP terminal to the DHCP server in the CSN. In this scenario, during the subscriber authentication the CSN provides the ASN with the IP address of the DHCP server in the CSN. This address is later on used by the DHCP relay in the ASN to relay the DHCP messages from the terminal to the correct DHCP server. The DHCP server can be located either in the V-CSN or in the H-CSN. In those cases, it is assumed that the ASN and the CSN may be separated by an unknown IP cloud, e.g. the public internet. Referring to FIG. 1, the reference points R3 and R5 may run across such an untrusted IP infrastructure.

Because of this topology of the telecommunication network, the DHCP server in the CSN is vulnerable to various types of attacks. The attacks could origin from both the untrusted network connecting the ASN and the CSN as well as from authenticated but misbehaving WiMAX subscribers. These attacks may be avoided if the DHCP relay in the ASN and the DHCP server in the CSN deploy a relay agent authentication suboption as defined in RFC 4030 (http://rfc.net/rfc4030.html). The methods defined in RFC 4030 provide for an authentication, integrity protection and replay protection of DHCP messages. Thereby, it is assumed that the DHCP relay and the DHCP server share a secret key that is used to compute the cryptographic checksum which provides the protection mentioned above.

It is therefore an object of the present invention to improve the security when exchanging DHCP messages between a telecommunication network and an IP subscriber.

According to the invention a method for transmission of a DHCP message between a telecommunication network, especially a telecommunication network according to the WiMAX-standard, and an Internet Protocol (IP) subscriber to the telecommunication network is provided wherein an information secured with an encryption key is added to the DHCP message and wherein the encryption key is derived from a basic key being provided by a network component of the telecommunication network.

By securing some information with an encryption key which is derived from a basic key maximum security against misuse can be provided. The encryption key is just used to secure an information which is added to the DHCP message but not the DHCP message itself. This means that the encryption key is used to digitally sign the message. Only an entity in possession of the encryption key can compute the signature, thereby verifying the authenticity of the message. The sending entity computes the message signature (using the encryption key as part of the computation) and adds the signature to the message. The receiving entity (also in possession of the encryption key) recomputes the signature by itself and compares the result with the signature received in the message. If they match, the receiving entity can be sure that received message was signed by the entity in possession of the encryption key (and that the message was not tampered with en route). The encryption keys may be dynamically derived from the basic key to protect the DHCP messages.

According to a further embodiment the encryption key is used to secure the DHCP messages exchanged between a DHCP server and a DHCP relay, optionally being located in different networks (subnets) of the telecommunication network. The DHCP server may be located in a core network, such as the CSN, whereas the DHCP relay may be located in an access network, such as the ASN in the WiMAX telecommunication network. Because of using the encryption key to secure the DHCP messages exchanged between the DHCP server and the DHCP relay the messages may be transferred across untrusted IP infrastructure without having the danger that the DHCP server may be aim of attacks.

According to a further embodiment the DHCP message generated by the subscriber is intercepted by the telecommunication network wherein the information encrypted with the encryption key is added when the DHCP message fulfills security and/or plausibility checks. Intercepting and checking the DHCP message may be done by the DHCP relay. Intercepting and checking includes the unicast traffic directed to the DHCP server. Thereby, a verification of a content of each DHCP message may be done. In case the DHCP message passes the various security and/or plausibility checks regarding spoofing, DoS attacks etc. the information encrypted with the encryption key will be added to the message, thereby guaranteeing to the telecommunication network, especially the DHCP server, that this is a legitimate DHCP message.

According to a further embodiment, the basic key may be generated using a generated random value. The random value may be generated by an AAA-server in a home network of the subscriber. The AAA-server may be located in the core network, e.g. the CSN. For security reasons the basic key may be specific to a DHCP server. The keys generated by the AAA-server may be transported to the DHCP server using RADIUS protocol. The RADIUS protocol may further be used to transport the basic key to an extensible authentication protocol or authenticator (IAP) as will be described later.

According to a further embodiment the basic key and an associated key identifier, the associated key respectively identifying a basic key, are transferred from the AAA-server of the subscriber's home network, preferably in an Access Request message, to the access network serving the subscriber. The associated key identifier may be generated by the AAA-server.

According to a further embodiment the encryption key is derived specific to each access network gateway in a respective access serving network, the access network gateway acting as a DHCP relay for the subscriber. This means, that from the basic key additional encryption keys are derived which are specific for each DHCP relay/DHCP server pair wherein these keys are used to protect the DHCP messages exchanged between the telecommunication network and the subscriber, especially between the DHCP relays and the DHCP server. The basic key and the derived keys are not bound to an individual user or authentication sessions but to a specific DHCP server and a DHCP relay/DHCP server-pair.

The access network gateway specific encryption key is generated using the basic key.

In a further embodiment the access network gateway specific encryption key is used to compute a relay agent authentication suboption as securing information. This means, for computation of the relay agent authentication suboption not the basic key is used but instead the encryption key which is derived from the basic key and which is specific for an access network gateway. The access network gateway acts as the DHCP relay for the subscriber. The proposed way of making the derived encryption key specific to each application network gateway is to include the IP address of the application network gateway into the key derivation process.

When the DHCP server in the core network receives a DHCP message containing the relay agent authentication suboption it must verify the authentication suboption. In case, the DHCP server does not have the basic key yet corresponding to the key identifier contained in the received authentication suboption, the DHCP server will request the basic key from the AAA-server. This may be accomplished in the same manner as a home agent is requesting a Home Agent-Root Key (HA-RK) when it needs to verify a Foreign Agent-Home Agent (FA-HA) authentication extension in the mobile IP registration request message. The DHCP server may use the Access Request message to request the basic key from the AAA-server. The DHCP server must include the value of the key identifier field from the authentication suboption of the received DHCP message in the access except message. The AAA-server delivers the basic key corresponding to the DHCP server and the indicated key identifier to the requesting DHCP server in the access accept message. In case the key identifier is unknown to the AAA-server, the AAA-server sends an access reject to the DHCP server. On the other hand, if the basic key associated with the received key identifier was already available at the DHCP server, the DHCP server need not to ask the AAA-server for the basic key. In this case, the DHCP server will use the already available basic key. Once the basic key is available at the DHCP server it generates the encryption key specific to this DHCP relay and uses the generated key to verify the authentication suboption. The DHCP server also includes the relay agent authentication suboption in its reply using the required encryption key to compute it.

In a further embodiment of the invention the basic key, the associated key identifier and a lifetime of the basic key will be maintained in the access network gateway acting as an extensible authentication protocol (EAP) authenticator until the lifetime of the basic key expires.

According to a further embodiment the encryption key, the key identifier and replay detection counter in the access network gateway acting as the DHCP relay for the subscriber will be maintained.

According to a further embodiment the key identifier and the replay detection values from an old DHCP relay to a new DHCP relay are transferred as part of the context via, especially WiMAX, specific signaling messages.

At any instance of time, the AAA-server may have several valid basic keys being specific to a single DHCP server. These basic keys must have different key identifiers and may have different lifetimes. Thereby, seamless refreshment of the basic keys is ensured enabling both an old and a new basic key to coexist and to be used simultaneously for some period.

In a further embodiment, when a DHCP server in the subscriber's home network receives a DHCP message from a DHCP relay of the access network for which no encryption key is available yet, but the authentication suboption indicates the key identifier already known to the DHCP server, the DHCP server generates a new encryption key from the known basic key associated with the received key identifier.

According to a further embodiment derivation rules for encryption keys and for basic keys are used.

The invention further comprises a telecommunication network component or components for carrying out a method according to any of the preceding described ways.

The invention enables connecting of a DHCP relay in an access network and a DHCP server in a core network via an untrusted IP network, such as the internet. By providing an effective key management mechanism it is possible to provide a relay agent authentication suboption in DHCP messages which prohibits the DHCP server in the core network being subject of various types of attacks. Since encryption keys used to secure the DHCP messages are derived dynamically and have a limited lifetime bound to the lifetime of a subscriber session the provided method is capable for very large deployments.

The invention further will be described by way of example and a reference to the accompanying figures.

Figure 2:
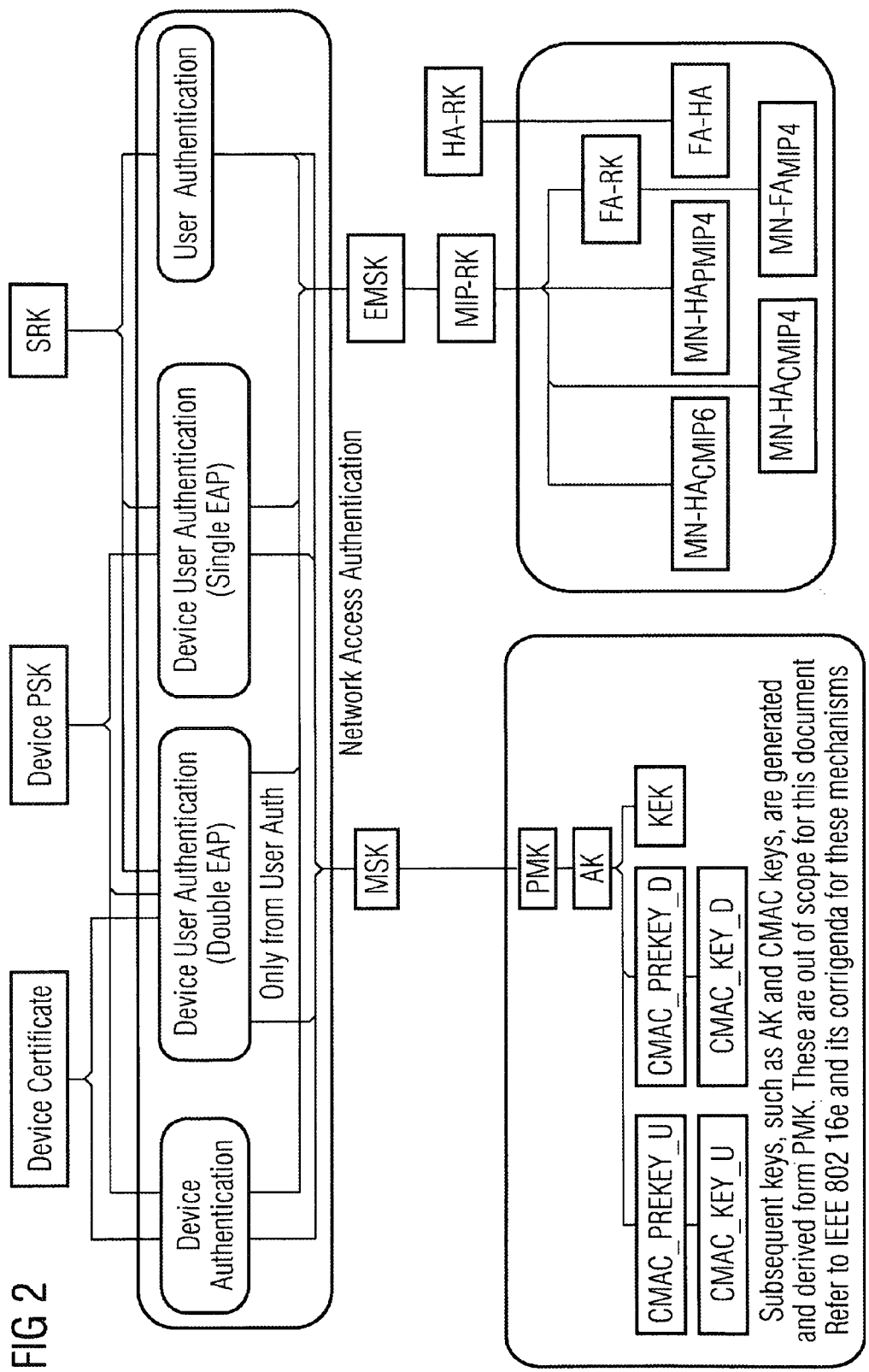
Figure 3:
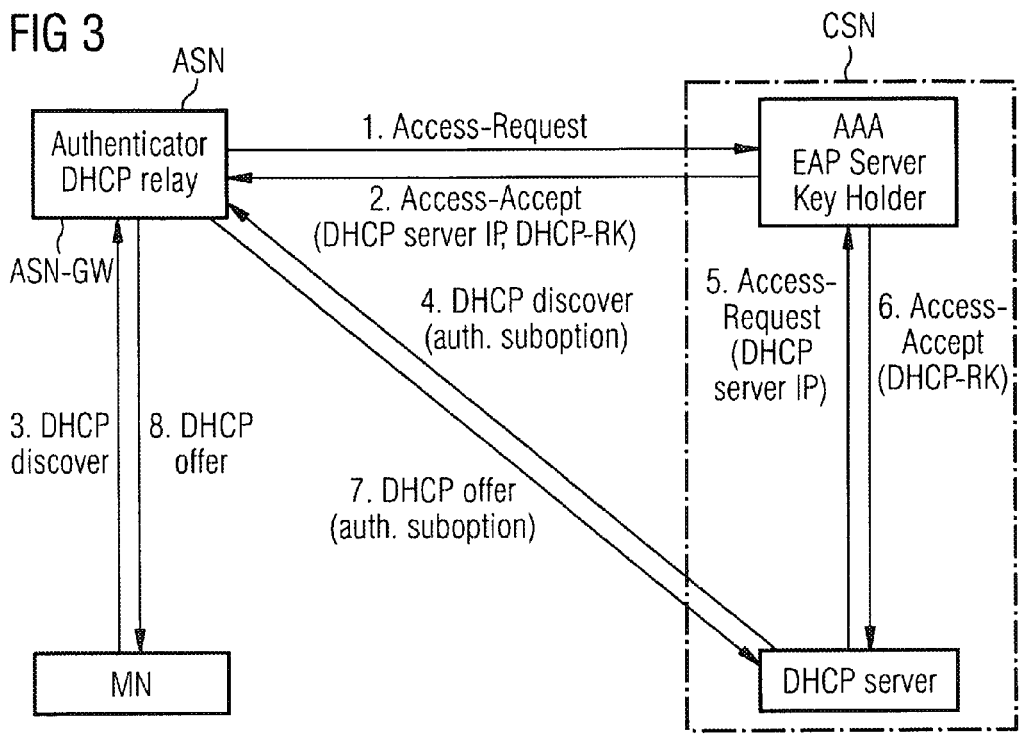
Figure 4:
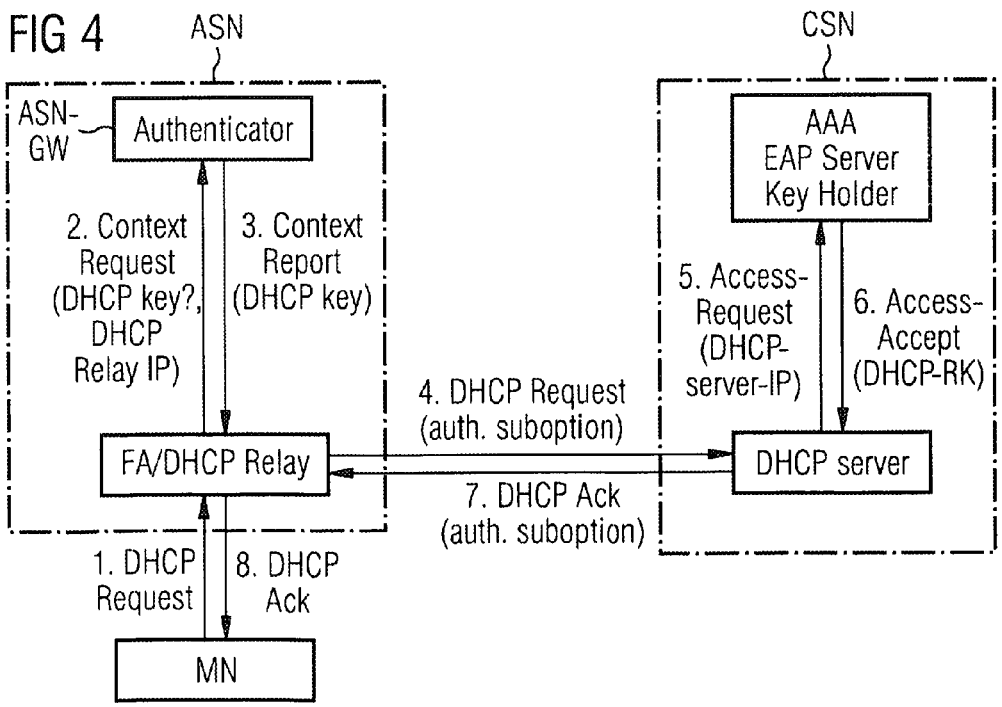

FIG. 1 shows a network reference model according to WiMAX telecommunication network, FIG. 2 shows a WiMAX key hierarchy, FIG. 3 shows the process of initial DHCP key distribution, and FIG. 4 shows a schematic view of the DHCP key distribution in case an authenticator and a DHCP relay are not collocated.

The present invention will be described with reference to a WiMAX telecommunication network. The known WiMAX network reference model is illustrated in FIG. 1. A feature of the WiMAX telecommunication network architecture is the support of "simple IP" terminals SS/MS. These simple IP terminals SS/MS use DHCP (Dynamic Host Configuration Protocol) to acquire an IP address and other IP configuration parameters. The IP address for the IP terminal SS/MS which will be referred to as a subscriber is allocated by a WiMAX connectivity serving network (CSN), either a Home-CSN (Home VSP) or a Visited-CSN (Visited CSN). The assignment of the IP address to the subscriber SS/MS is performed by a WiMAX Access Serving Network (ASN) which is called an access network.

According to the invention the assignment of the IP address will be done by using a DHCP relay in the ASN. Thereby, it is assumed that a DHCP server is located in the CSN and the ASN provides the DHCP relay. The object of the DHCP relay is to relay DHCP messages from the subscriber SS/MS to the DHCP server in the CSN. During the subscriber authentication the CSN provides the ASN with the IP address of the DHCP server in the CSN. This IP address is later on used by the DHCP relay to relay the DHCP messages from the terminal to the correct DHCP server. Since the CSN and the ASN may be located in different sub-networks which are connected via an unknown IP network, for instance the public internet. As a result data exchanged between the DHCP relay and the DHCP server may run across an untrusted IP infrastructure (cf. nodes R3 and R5).

To avoid that the DHCP server might get attacked the invention suggests to use encryption keys, hereinafter called DHCP keys, to secure DHCP messages between the DHCP relay and the DHCP server. A similar approach is already used by WiMAX Forum NWG standards to generate the HA-RK used for authentication of Mobile IP signaling between the HA and the FA. FIG. 2 illustrates the WiMAX key hierarchy with various keys and how they are derived. An explanation of this known illustration can be found in RFC 4030. The DHCP keys are generated from a basic key which will be referred to a DHCP-RK (Root Key). The DHCP-RK key is generated by an AAA-server which is located in the CSN. The key is transported to the DHCP relay and the DHCP server using the AAA protocol. From the DHCP-RK additional DHCP keys are derived which are specific for each DHCP relay/DHCP server pair and these DHCP keys are used to protect DHCP messages exchanged between the DHCP relay(s) and the DHCP server.

The DHCP-RK and the DHCP keys derived from it do not depend on a master session key (MSK) or an extended master session key (EMSK) generated as a result of a specific EAP authentication. Hence, the DHCP-RK and the derived DHCP keys are not bound to individual user or authentication sessions but to a specific DHCP server and to DHCP relay/DHCP server pairs. The DHCP-RK will be generated only on demand but not for each EAP (re-)authentication taking place. Nevertheless, the DHCP-RK key along with the key identifier and lifetime values are delivered to the authenticator during a network access authentication of a subscriber. The lifetime and a key identifier generated by the DHCP server and identifying a specific DHCP-RK are managed by the AAA-server. It is the responsibility of the AAA-server to deliver a new DHCP-RK to the authenticator prior to the expiration of the DHCP-RK.

The DHCP-RK is generated by the AAA-server assigning the DHCP server to an authenticating subscriber. A different DHCP-RK is generated for every DHCP server. A DHCP-RK maybe generated by the AAA-server as follows:
DHCP-RK=HMAC-SHA1 (RAND, "DHCP APPLICATION ROOT KEY").

Thereby RAND is a random value generated by the AAA-server. The AAA-server also associates each DHCP-RK with a unique key identifier. The key identifier is defined in RFC 4030. The key identifier is unique within the scope of a single DHCP server. In case several DHCP-RKs exist for a single DHCP server at the same time, they must have different key identifiers. DHCP-RKs belonging to different DHCP servers may use the same key identifier. The AAA-server delivers the DHCP-RK to the EAP authenticator and the DHCP server.

The EAP authenticator generates from the DHCP-RK a DHCP key for a specific DHCP relay/DHCP server pair if requested by the specific DHCP relay. A DHCP key specific to a DHCP relay which also is called an application network gateway ASN-GW may be derived as follows:
DHCP-key=HMAC SHA1 (DHCP-RK, "DHCP AUTH", DHCP-Relay-IP, DHCP-Server-IP).

This key is derived by the EAP authenticator and the DHCP server. It is transferred by the EAP authenticator to the DHCP relay.

At any instance of time, the AAA-server may have several valid DHCP-RK keys specific to a single DHCP server. These DHCP-RK keys must have different key identifiers and may have different lifetimes. This is necessary to enable a seamless refreshment of the DHCP-RK enabling both an old and a new DHCP-RK to coexist and to be used simultaneously for some period.

The keys generated by the AAA-server may be transported to the DHCP server and the authenticator using the RADIUS protocol. The DHCP keys generated by the authenticator (derived from a DHCP-RK) are transported to the DHCP relay for instance via WiMAX specific R4 signaling. The keys generated by the DHCP server are never transported outside of the DHCP server.

Referring to FIG. 3, the distribution of DHCP keys is shown for the case when the DHCP relay is collocated with the EAP authenticator.

As described above the authenticator and the DHCP relay are located in the ASN whereas the AAA-server, an EAP server and a key holder together with the DHCP server are located in the CSN. The subscriber to the telecommunication network is depicted with MN.

The key distribution will be executed during an authentication process of the subscriber MN to the telecommunication network. Therefore, the subscriber MN sends a request message to the access network gateway ASN-GW acting as an authenticator and the DHCP relay. The access network gateway transfers an Access-Request message to the CSN, especially the AAA-server. The authenticator receives a DHCP server address in an Access-Accept message according to the RADIUS protocol as a result of successful subscriber authentication. In case several DHCP-RKs associated with the DHCP server are available at the AAA-server, the AAA-server should include the DHCP-RK with the longest remaining lifetime in the Access-Accept message. Besides the DHCP-RK, the access-accept message contains also the lifetime and a key identifier of the DHCP-RK the latter being provided by the DHCP server. The DHCP-RK is transported over RADIUS and is encrypted, for instance using the method defined in RFC-2868 section 3.5. The keys generated by the AAA-server are stored in a key holder in the authenticator at the ASN (not shown). At the time of DHCP procedures, the DHCP relay obtains the derived DHCP key from the key holder at the authenticator. The key holder derives the DHCP key specific to the requesting DHCP relay from the DHCP-RK and delivers the derived key, its lifetime and the key identifier associated with DHCP-RK to the DHCP relay. The DHCP relay uses the received DHCP key to compute the authentication suboption and includes the suboption in the DHCP message. When the DHCP server receives a message with authentication suboption it searches for the corresponding DHCP key in its local cache by DHCP relay address and received key identifier. If the corresponding key is not found, the DHCP server derives a new DHCP key specific to this DHCP relay from the DHCP-RK. If several DHCP-RKs are available at the DHCP server, it uses the received key identifier to select the right DHCP-RK. If no DHCP-RK is found that is associated with the received key identifier, the DHCP server acquires the DHCP-RK from the AAA-server. This can take place in a same way as a home agent acquires a home agent root key. The DHCP sever must include the received key identifier in the access-request message. This will enable the AAA-server to locate the right DHCP-RK in case several DHCP-RKs are available for this particular DHCP server at the AAA-server.

FIG. 4 describes the distribution of the DHCP keys in the case when the DHCP relay and the authenticator are not collocated. When the DHCP relay intercepts a DHCP message from the subscriber it must provide it with the authentication suboption, as stated in RFC 4030. If the key corresponding to the DHCP server is not available at the DHCP relay, the DHCP relay will request a key from the authenticator by sending a Context-Request message with an empty DHCP-key TLV. The authenticator will derive the necessary key and deliver the derived key, its lifetime and the associated key identifier to the DHCP relay in a Context-Report message. Having acquired the DHCP key, the DHCP relay proceeds as described above in the embodiment of FIG. 3 when the DHCP relay and the authenticator are collocated.

The invention claimed is:

1. A method for transmission of a dynamic host configuration protocol message between a dynamic host configuration protocol server of a telecommunication network and an Internet protocol subscriber device connected to the telecommunication network, the method comprising:
    adding information secured with an encryption key to the dynamic host configuration protocol message by the dynamic host configuration protocol server or by a dynamic host configuration protocol relay arranged between the Internet protocol subscriber device and the dynamic host configuration protocol server, the dynamic host configuration protocol relay configured to relay the dynamic host configuration protocol message from the Internet protocol subscriber device to the dynamic host configuration protocol server;
    wherein the encryption key is derived from a basic key provided by a further server of the telecommunication network, and
    wherein the basic key is a specific key to the dynamic host configuration protocol server.

2. The method according to claim 1, wherein the adding comprises intercepting the dynamic host configuration protocol message generated by the Internet protocol subscriber device by the dynamic host configuration protocol relay located in the telecommunication network.

3. The method according to claim 1, wherein the encryption key is generated for a specific dynamic host configuration protocol server and dynamic host configuration protocol relay pair using the basic key specific to the dynamic host configuration protocol server.

4. The method according to claim 1, wherein the further server comprises an authentication, authorization, and accounting-server of a subscriber's home network,
    the method further comprising
    transferring the basic key and an associated key identifier, from the authentication, authorization, and accounting-server of the subscriber's home network in an access request message to an access network serving a subscriber,
    wherein the associated key identifies the basic key.

5. The method according to claim 1, wherein the encryption key is derived specific to each access network gateway in a respective access serving network that acts as a dynamic host configuration protocol relay for the Internet protocol subscriber device.

6. The method according to claim 1, further comprising:
    transferring a key identifier and replay detection values from an old dynamic host configuration protocol relay to a new dynamic host configuration protocol relay as part of a context via specific signaling messages.

7. The method according to claim 1, further comprising:
    when the dynamic host configuration protocol server in a subscriber's home network receives the dynamic host configuration protocol message from the dynamic host configuration protocol relay of an access network for which no encryption key is available yet, but an authentication suboption indicates a key identifier already known to the dynamic host configuration protocol server, generating, by the dynamic host configuration protocol server, a new encryption key from the known basic key associated with the received key identifier.

8. The method according to claim 1, wherein the telecommunication network comprises a network according to a worldwide interoperability for microwave access standard.

9. A telecommunication network component for transmission of a dynamic host configuration protocol message between a dynamic host configuration protocol server of a telecommunication network and an Internet protocol subscriber device connected to the telecommunication network, the telecommunication network component configured to
    add information secured with an encryption key to the dynamic host configuration protocol message received from the Internet protocol subscriber device or to the dynamic host configuration protocol message transmitted to the Internet protocol subscriber device, and
    derive the encryption key from a basic key provided by a further server of the telecommunication network,
    wherein the basic key is a specific key to the dynamic host configuration protocol server.

10. The telecommunication network component according to claim 9, further configured to generate the encryption key for a dynamic host configuration protocol server and dynamic host configuration protocol relay pair using the basic key specific to the dynamic host configuration protocol server.

11. The telecommunication network component according to claim 9, wherein the further server comprises an authentication, authorization, and accounting-server of a subscriber's home network,
    the telecommunication network component further configured to receive the basic key and an associated key identifier from the authentication, authorization, and accounting-server in an access request message,
    wherein the associated key identifies the basic key.

12. The telecommunication network component according to claim 9, wherein the telecommunication network component comprises the dynamic host configuration protocol server.

13. The telecommunication network component according to claim 12, wherein, when the dynamic host configuration protocol server receives a dynamic host configuration protocol message for which no encryption key is available yet, but an authentication suboption included in the dynamic host configuration protocol message indicates a key identifier already known to the dynamic host configuration protocol server, the DHCP server is configured to generate a new encryption key from the known basic key associated with the received key identifier.

14. The telecommunication network component according to claim 9, wherein, when the information encrypted with the encryption key is added, the telecommunication network component is further configured to intercept the dynamic host configuration protocol message generated by the Internet protocol subscriber device.

15. The telecommunication network component according to claim 9, wherein the telecommunication network component comprises at least one of a dynamic host configuration protocol relay and an access network authenticator component.

16. The telecommunication network component according to claim 9, wherein the telecommunication network component comprises an access network gateway, and wherein the encryption key is derived specific to the access network gateway using the basic key in a respective access serving network and acts as the dynamic host configuration protocol relay for the dynamic host configuration protocol message.

17. The telecommunication network component according to claim 14, further configured to support a transfer of a key identifier and replay detection values from an old telecommunication network component comprising a dynamic host configuration protocol relay functionality to a new telecommunication network component comprising a dynamic host configuration protocol relay functionality as part of a context via specific signaling messages.

18. The telecommunication network component according to claim 9, wherein the telecommunication network comprises a network according to a worldwide interoperability for microwave access standard.

\* \* \* \* \*